(12) United States Patent
Wu et al.

(10) Patent No.: US 11,952,665 B2
(45) Date of Patent: Apr. 9, 2024

(54) COATED METAL ALLOY SUBSTRATES AND PROCESS OF PRODUCTION THEREOF

(71) Applicant: Hewlett-Packard Development Company, L.P., Spring, TX (US)

(72) Inventors: Kuan-Ting Wu, Taipei (TW); Hsing-Hung Hsieh, Taipei (TW); Super Liao, Taipei (TW)

(73) Assignee: Hewlett-Packard Development Company, L.P., Spring, TX (US)

(*) Notice: Subject to any disclaimer, the term of this patent is extended or adjusted under 35 U.S.C. 154(b) by 323 days.

(21) Appl. No.: 17/298,901

(22) PCT Filed: Jun. 11, 2019

(86) PCT No.: PCT/US2019/036491
§ 371 (c)(1),
(2) Date: Jun. 1, 2021

(87) PCT Pub. No.: WO2020/251549
PCT Pub. Date: Dec. 17, 2020

(65) Prior Publication Data
US 2022/0112609 A1 Apr. 14, 2022

(51) Int. Cl.
*C23C 28/00* (2006.01)
*C09D 5/24* (2006.01)
(Continued)

(52) U.S. Cl.
CPC ............. *C23C 28/00* (2013.01); *C09D 5/24* (2013.01); *C09D 5/4411* (2013.01); *C09D 5/443* (2013.01); *C25D 13/12* (2013.01)

(58) Field of Classification Search
None
See application file for complete search history.

(56) References Cited

U.S. PATENT DOCUMENTS

2006/0257638 A1* 11/2006 Glatkowski .............. H01B 1/24
428/292.1
2008/0286559 A1* 11/2008 Lee ....................... C09D 163/00
428/323

(Continued)

FOREIGN PATENT DOCUMENTS

CN       105274603 A        1/2016
KR    2006/0039277     *  5/2006  ............... C09D 5/24
(Continued)

OTHER PUBLICATIONS

Yoon—KR 2006-0039277 A—MT—shielding paint w- 5% carbon nanotubes+binder w- amounts—2006 (Year: 2006).*
(Continued)

*Primary Examiner* — John Vincent Lawler
(74) *Attorney, Agent, or Firm* — HP Inc. Patent Department

(57) ABSTRACT

A coated metal alloy substrate, a process for producing a coating a metal alloy substrate, and an electronic device having a housing comprising a coated metal alloy substrate are described. The coated metal alloy substrate comprises a passivation layer deposited on the metal alloy substrate, a porous conductive water borne carbon nanotube layer on the passivation layer, and an electrophoretic deposition layer deposited on the porous conductive water borne carbon nanotube layer.

14 Claims, 2 Drawing Sheets

(51) Int. Cl.
 C09D 5/44 (2006.01)
 C25D 13/12 (2006.01)

(56) References Cited

U.S. PATENT DOCUMENTS

| | | | | |
|---|---|---|---|---|
| 2012/0107598 A1* | 5/2012 | Zou | ............ | C09D 7/65 |
| | | | | 977/932 |
| 2016/0231787 A1* | 8/2016 | Nguyen | ............ | G06F 1/181 |
| 2016/0326664 A1* | 11/2016 | Wu | ............ | C25D 13/12 |
| 2017/0325347 A1* | 11/2017 | Kashyap | ............ | C25D 13/20 |
| 2019/0055636 A1 | 2/2019 | Xiong et al. | | |

FOREIGN PATENT DOCUMENTS

| | | | | | |
|---|---|---|---|---|---|
| KR | 2006/0075234 | | * | 7/2006 | ............ C09D 5/24 |
| KR | 101271980 | | | 6/2013 | |
| WO | WO-2015112113 A1 | | | 7/2015 | |
| WO | WO 2017/018999 | | * | 2/2017 | ............ H05K 7/20 |
| WO | WO-2017018999 A1 | | | 2/2017 | |

OTHER PUBLICATIONS

Shin—KR 2006-0075234 A—MT—20% carbon nanotubes+ polymer w- amounts—2006 (Year: 2006).*

A. R. Boccaccini; et al.; "Bioactive Ceramic Coatings Containing Carbon Nanotubes On Metallic Substrates By Electrophoretic Deposition"; Journal of Materials Science, vol. 41, Issue 24, pp. 8144-8151; Dec. 2006.

Golabczak ; et al. ; "Estimation of Carbon Coatings Manufactured On Magnesium Alloys Applications"; Special Issues on Magnesium Alloys, Chapter: 3, Publisher: INTECH, Editors: Waldemar Alfredo Monteiro (2011), pp. 41-66.

Zhang; et al. ; "Fabrication of Nano-Structured HA/CNT Coatings On TI6AI4V By Electrophoretic Deposition for Biomedical"; Journal of Nanoscience and Nanotechnology, 2011.

* cited by examiner

COATED METAL ALLOY SUBSTRATES AND PROCESS OF PRODUCTION THEREOF

Electronic devices, such as laptops and mobile phones, include various components located with a metal alloy housing. Such metal alloy housings are made of metal alloy substrates that provide sought after metallic lustre of the metal alloy enclosure. Such enclosures should be able to withstand wear and tear from regular use and exposure to the natural environment. Also, the metal alloy housing can also act as a barrier to antenna signals to and from the electronic devices within the housing. Housing for such electronic devices are sought that allow the transmission of antenna signal.

Figure 1:
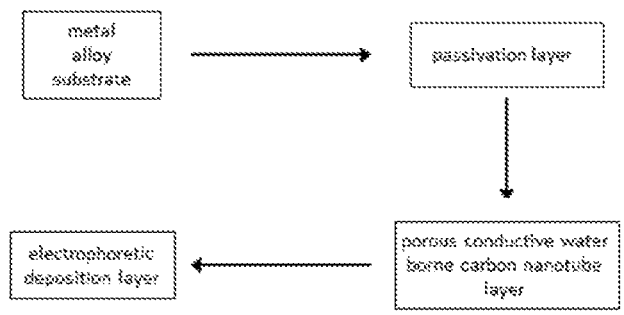
FIG. 1 is a flow chart showing an example of a process for producing a coated metal alloy substrate.

The figures depict several examples of the present disclosure. It should be understood that the present disclosure is not limited to the examples depicted in the figures.

DETAILED DESCRIPTION

Before the coated metal alloy substrate, process for producing a coated metal alloy substrate, and electronic device with a housing comprising a coated metal alloy substrate and related aspects are disclosed and described, it is to be understood that this disclosure is not limited to the particular process steps and materials disclosed herein because such process steps and materials may vary somewhat, it is also to be understood that the terminology used herein is used for the purpose of describing particular examples only. The terms are not intended to be limiting because the scope of the present disclosure is intended to be limited only by the appended claims and equivalents thereof.

It is noted that, as used in this specification and the appended claims, the singular forms "a", "an" and "the" include plural referents unless the context clearly dictates otherwise.

If a standard test is mentioned herein, unless otherwise stated, the version of the test to be referred to is the most recent at the time of filing this patent application.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 wt. % to about 5 wt. %" should be interpreted to include not only the explicitly recited values of about 1 wt. % to about 5 wt. %, but also include individual values and subranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

As used herein, the term "deposited" when used to refer to the location or position of a layer includes the term "disposed" or "coated".

As used herein, the term "engraving" when used to refer to the formation of a chamfered edge includes the term "etching" or "cutting".

As used herein, the term "comprises" has an open meaning, which allows other, unspecified features to be present. This term embraces, but is not limited to, the semi-closed term "consisting essentially of" and the closed term "consisting of". Unless the context indicates otherwise, the term "comprises" may be replaced with either "consisting essentially of" or "consists of".

Unless otherwise stated, any feature described herein can be combined with any aspect or any other feature described herein.

In an aspect, there is provided a coated metal alloy substrate for an electronic device comprising:
  a passivation layer deposited on the metal alloy substrate;
  a porous conductive water borne carbon nanotube layer on the passivation layer; and
  an electrophoretic deposition layer deposited on the porous conductive water borne carbon nanotube layer.

In another aspect, there is provided a process for producing a coated metal alloy substrate for an electronic device comprising:
  applying a passivation layer to the metal alloy substrate;
  applying a porous conductive water borne carbon nanotube layer to the passivation layer; and
  applying an electrophoretic deposition layer to the porous conductive water borne carbon nanotube layer.

In a further aspect, there is provided an electronic device having a housing, wherein the housing comprises:
  a metal alloy substrate;
  a passivation layer deposited on the metal alloy substrate;
  a porous conductive water borne carbon nanotube layer on the passivation layer; and
  an electrophoretic deposition layer deposited on the porous conductive water borne carbon nanotube layer.

Metal Alloy Substrate

The metal alloy substrate may comprise a metal selected from aluminium, magnesium, lithium, titanium, niobium, zinc and alloys thereof. These metals may be light-weight and can provide a durable housing.

Generally, the metal alloy comprises a content of metal of at least about 75 wt. %. For example, when the metal alloy is a magnesium alloy, the magnesium alloy may comprise at least about 80 wt. % magnesium, or at least 85 wt. % magnesium, or at least about 90 wt. % of magnesium, based on the total weight of the metal alloy.

The magnesium alloy may further comprise aluminium, zinc, manganese, silicon, copper, a rare earth metal or zirconium. The aluminium content may be about 2.5 wt. % to about 13.0 wt. %. When the magnesium alloy comprises aluminium, then at least one of manganese, zirconium, or silicon is also present. Examples of magnesium alloys include AZ31, AZ31B, AZ61, AZ60, AZ80, AM60, AZ91, AZ91D, LZ91, LZ14, ALZ alloys according to the American Society for Testing Materials standards.

In one example, the metal alloy comprises the components, based on the total weight of the metal alloy, Al: 0.02 wt. % to 9.7 wt. %, Zn: 0.02 wt. % to 1.4 wt. %, Mn: 0.02 wt. % to 0.5 wt. %, one or more component selected from Si: 0.02 wt. % to 0.1 wt. %, Fe: 0.004 wt. % to 0.05 wt. %, Ca: 0.0013 wt. % to 0.04 wt. %, Ni: 0.001 wt. % to 0.005 wt. %, Cu: 0.008 wt. % to 0.05 wt. %, Li: 9.0 wt. % to 14.3 wt. %, Zr: up to 0.002 wt. % and the balance being Mg and inevitable impurities.

Insert Moulded Metal Substrate

The metal alloy substrate may be an insert moulded metal substrate to form a metal substrate with sections comprising a further material, such as plastics. For example, the insert moulded metal substrate may be formed by using the metal substrate as a mould. This metal mould may have a section into which a material, such as plastic, is injected to form a plastic insert. Plastics used for insert moulded metal substrates may be selected from polybutylene terephthalate polyphenylene sulfide (PPS), polyamide (nylon), polyphthalamide (PPA), acrylonitrile butadiene styrene (ABS), polyetheretherketone (PEEK), polycarbonate (PC) and acrylonitrile butadiene styrene with polycarbonate (ABS/PC) with 15 to 50 wt. % glass fibre filler.

Passivation Layer

The passivation layer may be transparent. The passivation layer may comprise a chelating agent and a metal ion or chelated metal complex thereof, or a mixture of the chelating agent, the metal ion and the chelated metal complex. The chelated metal complex comprises a ligand coordinated to the metal ion. The ligand is the chelating agent.

The chelating agent may be selected from ethylenediaminetetraacetic acid (EDTA), ethylenediamine (EN), nitrilotriacetic acid (NTA), diethylenetriaminepenta(methylenephosphonic acid) (DTPPH), nitrilotris(methylenephosphonic acid) (NTMP), 1-hydroxyethane-1,1-diphosphonic acid (HEDP) and phosphoric acid. In one example, the chelating agent is DTPPH.

The metal ion is selected from an aluminium ion, a nickel ion, a chromium ion, a tin ion, an indium ion, and a zinc ion. In one example, the metal ion is selected from an aluminium ion, a nickel ion and a zinc ion.

In one example, the chelated metal complex may comprise DTPPH chelated to an aluminium ion. In another example, the chelated metal complex may comprise DTPPH chelated to a nickel ion. In a further example, the chelated metal complex may comprise DTPPH chelated to a zinc ion.

The passivation layer may have a thickness of from about 30 nm to about 3 µm, such as from about 200 nm to about 2 µm, or from about 500 nm to about 1 µm.

The passivation layer is deposited on the chamfered edge or edges. In one example, the passivation layer may also be deposited on the hydrophobic anti-finger print layer of the metal alloy substrate.

A Porous Conductive Water Borne Carbon Nanotube Layer

The porous conductive water borne carbon nanotube layer comprises porous carbon nanotubes and a water borne resin.

Porous carbon nanotubes disclosed herein are carbon nanotubes with voids in the structure. The voids in the carbon nanotubes are considered to contribute to the conductive properties of the material, for example allowing the transportation of antenna signal through the metal alloy substrate.

Porous carbon nanotubes may be present in the porous conductive water borne carbon nanotube layer in an amount of about 30 wt. % to about 75 wt. %, for example from about 35 wt. % to about 65 wt. %, or from about 40 wt. % to about 60 wt. %, from about 45 wt. % to about 55 wt. %, based on the total weight of the porous conductive water borne carbon nanotube layer.

The water borne resin may be selected from a polyacrylate polymer, a polyamide polymer, a polyester polymer and a polyurethane polymer.

The porous conductive water borne carbon nanotube layer may comprise the water borne resin in an amount of from about 0.3 wt. % to about 5 wt. %, for example from about 0.5 wt. % to about 4.5 wt. %, or from about 1 wt. % to about 4 wt. %, or from about 1.5 wt. % to about 3.5 wt. %, or from about 2 wt. % to about 3 wt. %, based on the total weight of the porous conductive water borne carbon nanotube layer.

The porous conductive water borne carbon nanotube layer may comprise further components selected from silver nanowire, graphene, aluminium powder and combinations thereof.

The porous conductive water borne carbon nanotube layer may comprise further components selected from a thickener, a surfactant, a dispersant, de-ionized water, and combinations thereof.

In one example the porous conductive water borne carbon nanotube layer comprises 5 wt. % polyacrylate, 0.5 wt. % of a thickener, such as PURE THIX®, 1.5 wt. % of a dispersant, such as sodium polyacrylate, 55 wt. % carbon nanotube and 38 wt. % de-ionized water, based on the total weight of the porous conductive water borne carbon nanotube layer.

The porous conductive water borne carbon nanotube layer may also allow the deposition of an electrophoretic deposition layer. Applying electrophoretic deposition on non-metallic surfaces is problematic as the process requires a charged surface. For example, electrophoretic deposition layer may often not be able to be applied to a plastic surface. However, application of a porous conductive water borne carbon nanotube layer onto a plastic surface may allow electrophoretic deposition to be carried out.

Electrophoretic Deposition Layer

The electrophoretic deposition layer comprises an electrophoretic polymer selected from polyacrylic polymer, polyacrylamide-acrylic copolymer and epoxy-containing polymer.

The electrophoretic deposition layer may be transparent. In one example, the electrophoretic deposition layer is colourless. In another example, the electrophoretic polymer layer may be coloured.

The electrophoretic deposition layer may comprise a pigment. Pigment particles may be dispersed throughout the electrophoretic deposition layer. The pigment may be selected from carbon black, titanium dioxide, clay, mica, talc, barium sulfate, calcium carbonate, synthetic pigment, pearl pigment, metallic powder, aluminium oxide, dye, graphene, graphite, and an inorganic powder. In one example, the pigment is a dye. The dye may be dispersed throughout the electrophoretic deposition layer.

In one example the electrophoretic deposition layer comprises, based on the total weight of the electrophoretic deposition layer, 10 wt. % polyacrylic copolymer resin, 1 wt. % titanium dioxide, 0.3 wt. % of an anionic surfactant, such as sodium dodecylbenzene and 88.7 wt. % de-ionized water.

The electrophoretic polymer layer may have a thickness of from about 5 µm to about 60 µm, for example from about 15 µm to about 50 µm, or from about 25 µm to about 40 µm, or from about 30 µm to about 35 µm.

Process for Producing a Coated Metal Alloy Substrate

The present disclosure also relates to a process for producing a coated metal alloy substrate disclosed herein. The process for producing a coated metal alloy is described below and shown in the flow chart in FIG. 1.

The metal alloy substrate is coated with a passivation layer. The passivation layer may be sprayed, rollered, dipped, or brushed onto the metal alloy surface.

The passivation surface may then be cleaned using ultrasonic cleaning before applying a further layer. The ultrasonic cleaning may be carried out at a frequency of 20-40 kHz at 50° C. for 30-180 seconds.

A porous conductive water borne carbon nanotube layer is then deposited on at least part of the passivation layer. The porous conductive water borne carbon nanotube layer may be sprayed, rollered, dipped, or brushed onto the metal alloy surface.

The metal alloy substrate coated with a passivation layer and a porous conductive water borne carbon nanotube layer may then be heated to a temperature from about 60° C. to about 120° C. for about 30 to about 90 minutes. For example, said heating may be carried out at about 70° C., or about 80° C., or about 90° C., or about 100° C., or about 110° C. For example, said heating may be carried out for about 40 minutes, or about 50 minutes, or about 60 minutes, or about 70 minutes, or about 80 minutes.

An electrophoretic deposition layer is then deposited on at least part of the porous conductive water borne carbon nanotube layer. To carry out the electrophoretic deposition, the metal alloy substrate is made an electrode of an electrochemical cell. The electrochemical cell also has an inert electrode as the counter electrode and an electrolyte comprising the electrophoretic polymer. A potential difference is applied across the electrodes of the electrochemical cell to deposit the electrophoretic polymer over the coating layer. The electrolyte may have a concentration of from about 5 wt. % to about 25 wt. %, such as from about 7 wt. % to about 20 wt. %, or from about 10 wt. % to about 15 wt. % of the electrophoretic polymer. The polymer, in general, has ionizable groups. When the polymer is a negatively charged material, then it will be deposited on the positively charged electrode (anode). When the polymer is a positively charged material, then it will be deposited on the negatively charged electrode (cathode).

The metal alloy substrate coated with a passivation layer, a porous conductive water borne carbon nanotube layer and an electrophoretic deposition layer may then be heated to a temperature from about 80° C. to about 180° C. for about 30 to about 120 minutes. For example, said heating may be carried out at about 90° C., or about 100° C., or about 110° C., or about 120° C., or about 130° C., or about 140° C., or about 150° C., or about 160° C., or about 170° C. For example, said heating may be carried out for about 40 minutes, or about 50 minutes, or about 60 minutes, or about 70 minutes, or about 80 minutes, or about 90 minutes, or about 100 minutes, or about 110 minutes.

Each layer may be applied to achieve a desire thickness. The thickness of each layer can be measure after it has been applied using, for example, a micrometer screw gauge or scanning electron microscope (SEM).

Prior to being exposed to the above treatment, the metal alloy substrate may be engraved using Computer Numeric Control (CNC) diamond cutter or a laser engraver, stamped or forged to shape the metal alloy substrate into, for example, a housing for electronic devices. For example, parts of the metal alloy substrate may be cut away and the each resulting chamfered edge may form an edge, a sidewall, a logo, a gap for a click pad, a gap for a fingerprint scanner. If the metal alloy is a magnesium alloy, thixomoulding may be used to achieve the desired shape.

The shaped metal alloy substrate may then be degreased and cleaned using ultrasonic vibration cleaning. The passivation layer may then be deposited onto this cleaned surface as described above.

Electronic Device

The electronic device of the present disclosure may be a computer, a laptop, a tablet, a workstation, a cell phone, a portable networking device, a portable gaming device and a portable GPS.

The electronic device has an electrical circuit, such as a motherboard or display circuitry. The housing may be external to the electrical circuit.

Housing

As described in the present disclosure, an electronic device may have a housing. The housing comprises a metal alloy substrate disclosed herein. The metal alloy substrate can be light-weight and may provide a durable housing. The housing of the present disclosure may have cosmetic features that are visually appealing to a user, such as an attractive surface finish and it may have a design features with a pleasant texture. The housing may also allow the transmission of antenna signal.

The housing may provide an exterior part of the electronic device, such as a cover or a casing of the electronic device. The housing may include a support structure for an electronic component of the electronic device. The housing may include a battery cover area, a battery door or a vent.

The housing may provide a substantial part of the cover or the casing of the electronic device. The term "substantial part" in this context refers to at least about 50%, such as at least about 60%, at least about 70%, at least about 80%, or at least about 90%, of the total weight of the cover or the casing. The housing may provide the entire cover or casing of the electronic device.

The housing can be a cover, such as a lid, the casing or both the cover and the casing of the electronic device. The casing may form a bottom or lower part of the cover of the electronic device. In one example, the housing is the casing of a laptop, a tablet, a workstation or a cell phone.

Figure 2:
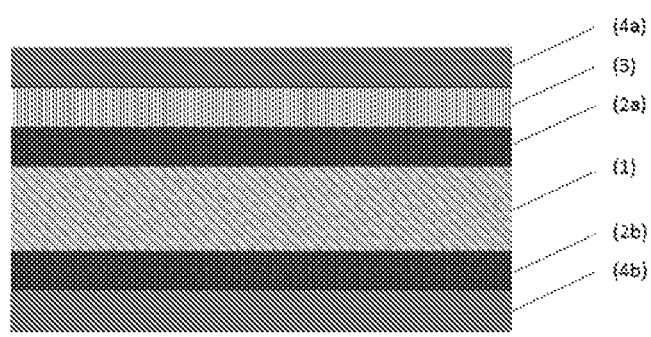
FIG. 2 is a partial cross-section diagram showing an example of a coated metal alloy substrate.

An example of a housing of the present disclosure is shown in FIG. 2, which is a partial cross section through the housing. The housing has a metal alloy substrate (1) with a passivation layer deposited on the upper surface (2a) and a passivation layer deposited on the lower surface (2b). A porous conductive water borne carbon nanotube coating (3) is deposited on the passivation layer on the upper surface (2a). An electrophoretic deposition layer (4a) is deposited on the water borne carbon nanotube coating (3) on the upper level. An electrophoretic deposition layer (4b) is deposited on the passivation layer on the lower surface (2b).

Figure 3:
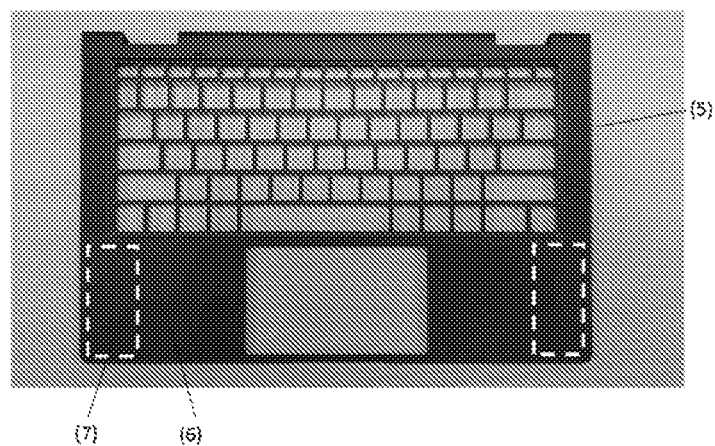
FIG. 3 shows an example housing for a laptop.

FIG. 3 shows an example of a housing of the present disclosure. The housing is a casing (5) for a keyboard of a laptop. The surface of the coated metal alloy substrate (6) provides cover for the laptop housing, including covering for the insert moulded plastic areas (7). The coating allows for antenna signal transportation throughout the housing.

EXAMPLES

The following illustrates examples of the methods and other aspects described herein. Thus, these Examples should not be considered as limitations of the present disclosure, but are merely in place to teach how to make examples of the present disclosure.

Example 1

A keyboard casing for a laptop was manufactured from a magnesium alloy substrate, comprising the magnesium alloy AZ91, which comprises, based on the weight of the total alloy, Al: 8.3-9.7 wt. %, Zn: 0.35-1.0 wt. %. Mn: 0.15-0.5 wt. %, Si: 0-1 wt. %, Cu: 0.03 wt. %, Fe: 0.005 wt. %, Ni: 0.002 wt. % and the remainder being Mg and inevitable impurities. The magnesium alloy substrate was formed by insert moulding the metal alloy with a polyphenylene sulfide. The surface was degreased and cleaned using ultrasonic cleaning.

The cleaned metal alloy substrate was then coated with a solution comprising a chelated metal complex where the chelating agent is DTTPH and the metal ion is zinc. The solution was dried and formed a transparent passivation layer that protects the underlying metallic surface of the substrate and prevents it from undergoing atmospheric oxidation. The surface was cleaned once again with ultrasonic cleaning before depositing a porous conductive water borne carbon nanotube layer, comprising 5 wt. % polyacrylate, 0.5 wt. % PURE THIX®, 1.5 wt. % sodium polyacrylate, 55 wt. % carbon nanotube and 38 wt. % de-ionized water.

The substrate was then heated at 80° C. for 30 minutes, cooled before applying an electrophoretic polymer. Using electrophoretic deposition, the electrophoretic polymer, which was a polyacrylic polymer was applied onto the water borne carbon nanotube layer to form a transparent coating layer. The substrate was then heated at 170° C. for 45 minutes.

The attractive metallic lustre of the magnesium alloy substrate remained visible through layers applied. The coated magnesium alloy substrate was found to exhibit corrosion resistance properties, which is part is achieved by the passivation layer. Also, antenna signal was able to transmit throughout the keyboard casing to and from the laptop due to the use of a porous water borne carbon nanotube layer. This coating for a metal alloy substrate also provides an environmentally friendly option in comparison to many known coatings.

The invention claimed is:

1. A coated metal alloy substrate for an electronic device comprising:
   a metal alloy substrate and a passivation layer deposited on the metal alloy substrate;
   a porous conductive water borne carbon nanotube layer on the passivation layer; and
   an electrophoretic deposition layer deposited on the porous conductive water borne carbon nanotube layer, wherein the porous conductive water borne carbon nanotube layer comprises 30 to 75 wt % porous carbon nanotubes and 0.3 to 5.0 wt. % water borne resin, based on the total weight of the porous conductive water borne carbon nanotube layer.

2. The coated metal alloy substrate according to claim 1, wherein the passivation layer is a transparent passivation layer comprising a chelating agent and a metal ion or chelated metal complex thereof.

3. A coated metal alloy substrate according to claim 2, wherein the chelating agent is selected from ethylenediaminetetraacetic acid, ethylenediamine, nitrilotriacetic acid, diethylenetriaminepenta(methylenephosphonic acid), nitrilotris(methylenephosphonic acid), 1-hydroxyethane-1, 1-diphosphonic acid and phosphoric acid, and the metal ion is selected from an aluminum ion, a nickel ion, a chromium ion, a tin ion, an indium ion, and a zinc ion.

4. The coated metal alloy substrate according to claim 1, wherein the porous conductive water borne carbon nanotube layer further comprises a component selected from silver nanowire, graphene, aluminium powder and combinations thereof.

5. The coated metal alloy substrate according to claim 1, wherein the water borne resin is selected from a polyacrylate polymer, a polyamide polymer, a polyester polymer and a polyurethane polymer.

6. The coated metal alloy substrate according to claim 1, wherein the electrophoretic deposition layer comprises an electrophoretic polymer selected from polyacrylic polymer, polyacrylamide-acrylic copolymer and epoxy-containing polymer.

7. The coated metal alloy substrate according to claim 1, wherein the metal alloy substrate comprises a metal selected from aluminium, magnesium lithium, titanium, niobium, zinc and alloys thereof.

8. The coated metal alloy substrate according to claim 1, wherein the metal alloy substrate is an insert moulded metal substrate comprising a plastic insert.

9. The coated metal alloy substrate according to claim 8, wherein a plastic in the plastic insert is selected from polybutylene terephthalate, polyphenylene sulfide, polyamide, polyphthalamide, acrylonitrile butadiene styrene, polyetheretherketone, polycarbonate and acrylonitrile butadiene styrene with polycarbonate.

10. The coated metal alloy substrate according to claim 1, wherein the electronic device is selected from a computer, a laptop, a tablet, a workstation, a cell phone, a portable networking device, a portable gaming device and a portable GPS.

11. A process for producing a coated a metal alloy substrate for an electronic device comprising:
   applying a passivation layer to a metal alloy substrate;
   applying a porous conductive water borne carbon nanotube layer to the passivation layer; and
   applying an electrophoretic deposition layer to the porous conductive water borne carbon nanotube layer, wherein the porous conductive water borne carbon nanotube layer comprises 30 to 75 wt % porous carbon nanotubes and 0.3 to 5.0 wt. % water borne resin, based on the total weight of the porous conductive water borne carbon nanotube layer.

12. A process for coating a metal alloy substrate according to claim 11, wherein the metal alloy substrate bearing the porous conductive water borne carbon nanotube layer is made an electrode of an electrochemical cell, wherein the electrochemical cell has an inert electrode as the counter electrode and an electrolyte comprising the electrophoretic polymer.

13. A process for coating a metal alloy substrate according to claim 12, wherein a potential difference is applied across the electrodes of the electrochemical cell to deposit the electrophoretic polymer over the passivation layer.

14. An electronic device having a housing, wherein the housing comprises:
   a metal alloy substrate;
   a passivation layer deposited on the metal alloy substrate;
   a porous conductive water borne carbon nanotube layer on the passivation layer; and
   an electrophoretic deposition layer deposited on the porous conductive water borne carbon nanotube layer, wherein the porous conductive water borne carbon nanotube layer comprises 30 to 75 wt % porous carbon nanotubes and 0.3 to 5.0 wt. % water borne resin, based on the total weight of the porous conductive water borne carbon nanotube layer.

\* \* \* \* \*